US008615438B2

(12) United States Patent
Hammad (10) Patent No.: US 8,615,438 B2
(45) Date of Patent: Dec. 24, 2013

(54) TIME-DEPENDENT RESPONSE TO USER-DETERMINED UNAUTHORIZED TRANSACTION

(75) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 274 days.

(21) Appl. No.: 12/687,376

(22) Filed: Jan. 14, 2010

(65) Prior Publication Data

US 2010/0274679 A1 Oct. 28, 2010

Related U.S. Application Data

(60) Provisional application No. 61/173,371, filed on Apr. 28, 2009.

(51) Int. Cl.
*G06Q 20/00* (2012.01)

(52) U.S. Cl.
USPC ............. 705/21; 705/35; 705/40; 705/33; 705/30; 705/37; 705/64; 705/44; 705/16; 705/39; 705/38; 705/24; 705/34; 235/379; 235/380; 235/382; 235/375; 340/540; 340/571; 340/541

(58) Field of Classification Search
USPC .......................................................... 705/21
See application file for complete search history.

(56) References Cited

U.S. PATENT DOCUMENTS

| 6,340,978 | B1 * | 1/2002 | Mindrum ....................... 715/764 |
| 7,331,518 | B2 * | 2/2008 | Rable ............................ 235/380 |
| 7,346,927 | B2 * | 3/2008 | Hillmer ........................... 726/22 |
| 7,468,663 | B1 * | 12/2008 | Rufolo et al. .................. 340/541 |
| 7,840,277 | B2 * | 11/2010 | Matos ............................. 607/60 |
| 2002/0116329 | A1 * | 8/2002 | Serbetcioglu et al. .......... 705/39 |
| 2003/0144952 | A1 * | 7/2003 | Brown et al. ................... 705/40 |
| 2005/0086164 | A1 * | 4/2005 | Kim et al. ...................... 705/40 |
| 2005/0199714 | A1 * | 9/2005 | Brandt et al. ............. 235/382.5 |
| 2005/0268107 | A1 | 12/2005 | Harris et al. |
| 2006/0016878 | A1 * | 1/2006 | Singer et al. ................. 235/380 |
| 2007/0000999 | A1 * | 1/2007 | Kubo et al. .................. 235/380 |

FOREIGN PATENT DOCUMENTS

| KR | 10-2005-0012919 A | 2/2005 |
| WO | WO 2006/024080 A1 | 3/2006 |

OTHER PUBLICATIONS

Farrall, Kenneth N.. Suspect until proven guilty a problematization of state dossier systems via two case studies: The United States and China. University of Pennsylvania, ProQuest, UMI Dissertations Publishing, 2009. 3405375.*
International Search Report mailed on Dec. 1, 2010. for International Application No. PCT/US2010/032604 filed on Apr. 27, 2010, 3 pages.

* cited by examiner

*Primary Examiner* — Ryan Zeender
*Assistant Examiner* — Fawaad Haider
(74) *Attorney, Agent, or Firm* — Kilpatrick Townsend & Stockton LLP (57) ABSTRACT

A system and method is described for alerting authorities or taking other corrective authoritative action to a possibly fraudulent credit card transaction. A cardholder is notified that a transaction has just taken place and is given an opportunity to indicate that he or she did not authorize the transaction. If so indicated, and depending on how recent the transaction was (e.g. 15 seconds ago) then an alert is automatically sent to the merchant, store security, or local police. In addition, a store camera can be automatically activated to zoom in and record the perpetrator of the fraudulent transaction.

18 Claims, 8 Drawing Sheets

TIME-DEPENDENT RESPONSE TO USER-DETERMINED UNAUTHORIZED TRANSACTION

CROSS-REFERENCES TO RELATED APPLICATIONS

This application claims the benefit of U.S. Provisional Application No. 61/173,371, filed Apr. 28, 2009 titled "Alerts Based System and Method," which is herein incorporated by reference in its entirety for all purposes.

BACKGROUND

1. Field of the Invention

Systems and methods for alerting authorities to fraud are disclosed. Specifically, methods for alerting the police, merchant, or third parties in near real-time to fraudulent debit or credit card transaction attempts at retail stores are disclosed.

2. Discussion of the Related Art

In processing credit card, debit card, and other payment card and account transactions between customers and merchants, transaction data is accumulated by a card processing company through a payment processing system for each attempted transaction. Such transaction data typically includes an entry or "transaction record" for each transaction. Each transaction record includes data corresponding to one transaction. The transaction record can include a date and time at which the transaction was made, a cardholder account identifier (i.e., an account number of a customer), a merchant identifier (i.e., a name and address of the merchant, a unique merchant number, or a categorical grouping), the geographic location (e.g. the city or zip code) of the transaction, and the amount of the transaction and whether it was a debit or credit.

A customer or other person typically initiates a transaction by handing his or her portable consumer device (e.g., a credit card) to a store clerk who then swipes the card through a card reader. Some point of sale (POS) devices are set up so that the customer can swipe the card himself or herself through card readers.

Information about the attempted transaction is then transmitted from the card reader to the store's bank. The store's bank is sometimes called an "acquirer." The acquirer and the merchant have a preexisting relationship for the acquirer to process credit card and other transactions for such sales through the store. After the information is received by the acquirer, the acquirer then requests forwards an authorization request to an issuer via a payment processing network.

The payment processing network can accept inputs (e.g. authorization requests for transactions) from acquirers and can forward the authorization requests to the institution that issued the cardholder's card account. This institution is sometimes called an "issuer." The issuer can send an authorization response that will approve or decline the transaction depending on such factors as whether the cardholder has enough money in his account to cover the purchase. This approval/decline message can be sent back to the originating acquirer and to the originating merchant.

If the transaction was performed by someone committing fraud, such as by a person using a stolen credit card, the real accountholder may not be aware of the transaction until later. Typically, this would occur when the accountholder receives his or her monthly statement detailing all transactions for the month. The time that elapses from the fraudulent transaction until the accountholder recognizes the transaction on his or her monthly statement can be many days, such as up to 30 or 60 days, depending on the billing cycle. After such time has passed, the accountholder may not recognize the extra transaction(s) on the statement.

If and when the consumer does recognize the fraudulent transaction on his or her statement, the only recourse may be to contact the issuer. The issuer can then perform research about the transaction with the acquirer and the merchant. This can be a long and expensive procedure that typically takes place many days or months after the theft.

Embodiments of the invention address these and other problems.

BRIEF SUMMARY

Embodiments in accordance with the present disclosure relate to alerting authorities, such as the police, to a fraudulent transaction attempt with a stolen credit card or other portable consumer device. An accountholder of the card is notified by email, short messaging service (SMS), instant messaging (IM), etc. that a retail transaction is being attempted on his or her card. The accountholder can then send an indicator, such as a reply email, that indicates that the transaction attempt was not authorized. A system can then calculate how much time has elapsed since the transaction attempt, and if the transaction attempt was very recent (e.g. in the last 5 minutes), send an alert to the local police, store security provider, or merchant at the store location. To lend credibility to the alert, among other things, the alert can include very specific information about the attempted transaction, such as the timestamp, store location, cash register upon which it was attempted, and store clerk who helped with the transaction.

If the transaction was not so recent (e.g. in the last 30 minutes), then the alert can be sent to the police or mall police local to the store location so that officers can be apprised that an identity thief or fraudster is in the area. In addition, the merchant can be alerted so that the merchant can retain evidence (e.g. store videotape, interview store employee, keep fingerprints on a pen used to sign receipt) for later prosecution if the perpetrator is caught.

One embodiment in accordance with the present disclosure relates to sending a transaction notification message to a user after a transaction is attempted by an unauthorized person using an account identifier associated with a portable consumer device. The transaction notification message is sent substantially contemporaneously with the initiation of the attempted transaction. The method also includes receiving a response indicator from the user that the attempted transaction is not authorized by the user, determining a time difference between a present time and a time that the transaction attempt occurred, comparing the time difference to a time threshold, and, based on whether the time difference is within the time threshold, taking corrective authoritative action substantially contemporaneously with the initiation of the attempted transaction.

The method can include sending a command to a videocamera at a location of the transaction in which the command can be to actuate or turn on, zoom in, increase resolution or quality, etc.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, a method is described in which an alert is sent to the police, or some other corrective authoritative action is performed, just after a credit or debit cardholder answers a text message on his phone about a transaction he did not make. Alternatively or in conjunction with informing the police, a computerized system can automatically inform the merchant with whom the transaction was attempted so that evidence (e.g. store video) can be retained. A store's videocamera can be slewed, zoomed, etc. so that a perpetrator can be caught on film.

As an example, a credit card purchase is attempted by a person who is not authorized by the credit card owner to make the purchase. The credit card, or other payment card, might have been stolen from the owner or inadvertently left with an unscrupulous employee of a merchant at a previous location. The person who is not authorized could also be a dependent child, roommate, or someone else who has access to the cardholder's wallet or purse in which the card is usually stored.

The cardholder, having enrolled in a service to be alerted on his phone or other portable consumer device, is then alerted to the transaction. The cardholder alert may be triggered by its amount (e.g. over $40), its location (e.g., a red light district of a foreign city), or other factors which indicate that the transaction is not being initiated by the cardholder him- or herself. The cardholder alert, which may be in the form of a transaction notification message, travels from a payment processor (e.g., a payment processing network), through an appropriate communication network, to the cardholder's cell phone. The phone displays the message to the cardholder.

The transaction notification message is sent substantially contemporaneously with the initiation of the attempted transaction. In some embodiments, the initiation of the transaction can occur when an authorization request message is generated and is forwarded to an issuer via a payment processing network. "Substantially contemporaneously" includes within 5, 10, 30, or 60 seconds, and within 2, 5, 10, 15, and 30 minutes of the initiation of the transaction attempt. Substantially contemporaneously can include time periods that are recent enough so that a perpetrator could still be in the store, walking out of the store, walking in the mall in which the store is located, in the parking lot, or driving in the local area.

The transaction notification message can be sent to a cellular phone, pager, portable computer, or other wired or wireless communication device specified by the cardholder. Alternatively, the cardholder can specify an email address, phone number, or other addressing mechanism such that a communication sent to the address will be available at wherever the cardholder may be. Along with an addressing mechanism, the cardholder can specify the type of communication and format. Communication formats can include short message service (SMS), multimedia message service (MMS), email, instant messaging, tweets, audio voice, or other formats.

The transaction notification message can have a message prompt for the user of the communication device to answer, such as a prompt asking if the user, who is presumably the cardholder, authorized the transaction. The prompt can be simple textual instructions for a user to dial a special number, or the prompt can include a graphical user interface (GUI) button, such that if the button is pressed, then a response is sent. The response is one which indicates that the user did not authorize the transaction. Conversely, in some instances a lack of a response can indicate that the transaction was not authorized if the prompt were one in which a user must affirmatively authorize the transaction.

A response from the user is then sent by the portable consumer device to a computerized system. The system may be the same system that sent the transaction notification message, or the system may be a separate system.

The computerized system handles the receipt of the user's notification and sending of alerts or other corrective authoritative actions. The system can be a computer server based system and/or a cloud computing based networked system.

The computer system, which has access to data regarding the attempted transaction, then determines a time difference between the present time (e.g., the time at which the response from the user is received by the computer system) and the time that the transaction attempt occurred. This time difference, or 'recency,' of the attempted transaction is calculated.

The time difference is compared to a time threshold, which may have been input by the cardholder during enrollment in the notification system, or may have been hard coded or pre-selected as a default option by the system.

If the time difference is within the time threshold, then corrective authoritative action can then be taken by the system substantially contemporaneously with the attempted transaction. For example, if the response from the cardholder is received within 45 seconds of the transaction being attempted, then store security can be alerted in order to stop and detain the person who attempted the transaction. Because only 45 seconds had passed between the time that a card had been slid through a reader and the cardholder answering "no" to the notification, the person attempting the transaction may still be at the checkout stand.

Other corrective actions can also be taken, depending on how recent the transaction was made. For example, the merchant with whom the unauthorized person attempted the transaction can be notified by phone. Headquarters of the merchant can be notified, or a direct, automated call to the cashier can be made.

A store camera can take a snapshot of the perpetrator, or a videocamera can be commanded to slew or zoom in to better see the perpetrator. Additionally, the videocamera can be commanded to begin recording at high quality or high resolution so as to avoid a grainy picture of the perpetrator. Storage associated with the videocamera can also be allocated to make room for higher resolution images, video streams, and/or high quality audio of the store environment.

Figure 1A:
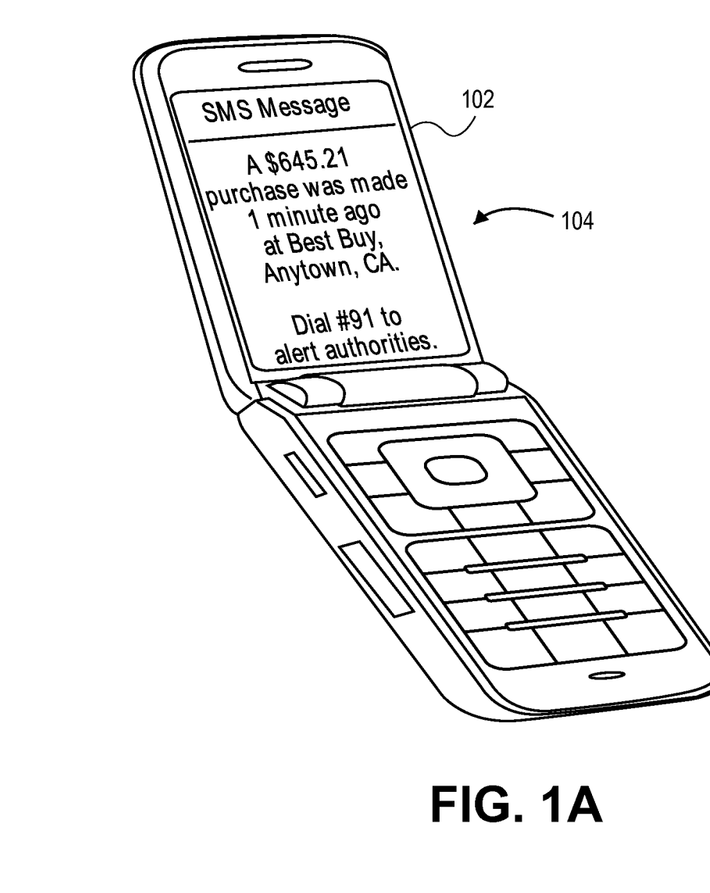
FIG. 1A illustrates a cellular phone with a short message system (SMS) cardholder alert message in accordance with an embodiment.

FIG. 1A illustrates cellular phone 102 with short message service (SMS) message 104 indicating to the phone's user that a purchase was made on his or her account. The message can indicate the dollar amount, the store location, what kind of transaction (i.e. purchase), and how recent the transaction was made. The bottom portion of the message indicates a relatively easy to remember number to dial to alert authorities if the transaction was not authorized by the cardholder.

Figure 1B:
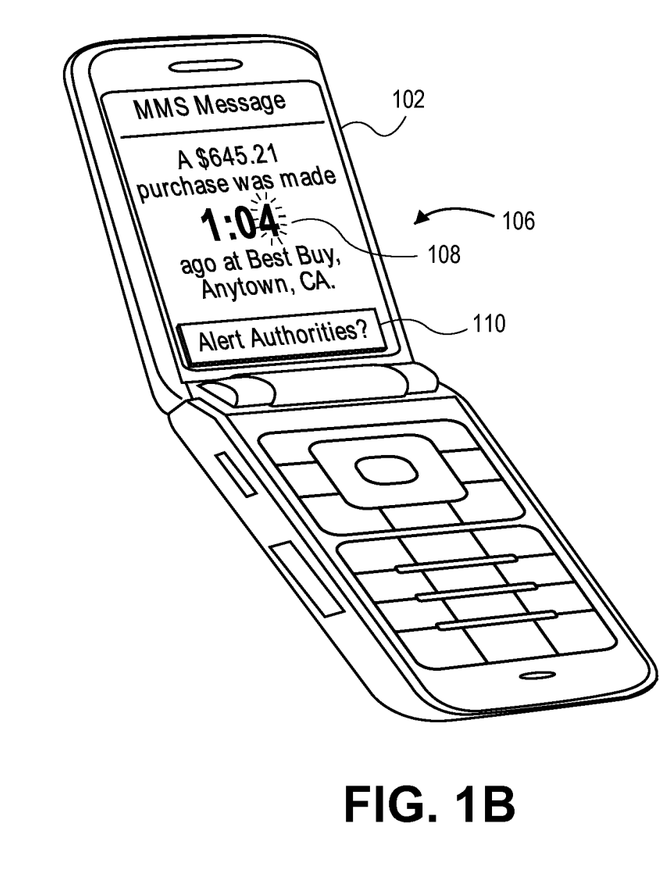
FIG. 1B illustrates a cellular phone with an alternate cardholder alert message in accordance with an embodiment.

FIG. 1B illustrates cellular phone 102 with a multimedia messaging service (MMS) communiqué 106. In the MMS message, the time elapsed counter 108 counts up time that has gone by since the transaction was attempted. Time elapsed counter 108 is updated to reflect the actual elapsed time, down to the second. This changing time can impart urgency to the reader so that a decision on whether to alert authorities is made quickly. Also embedded in the message is graphical user interface (GUI) button 110 which, with a cursor, focus, or other software pointer, can be pressed or clicked by the user to alert authorities to an unauthorized transaction.

Figure 2:
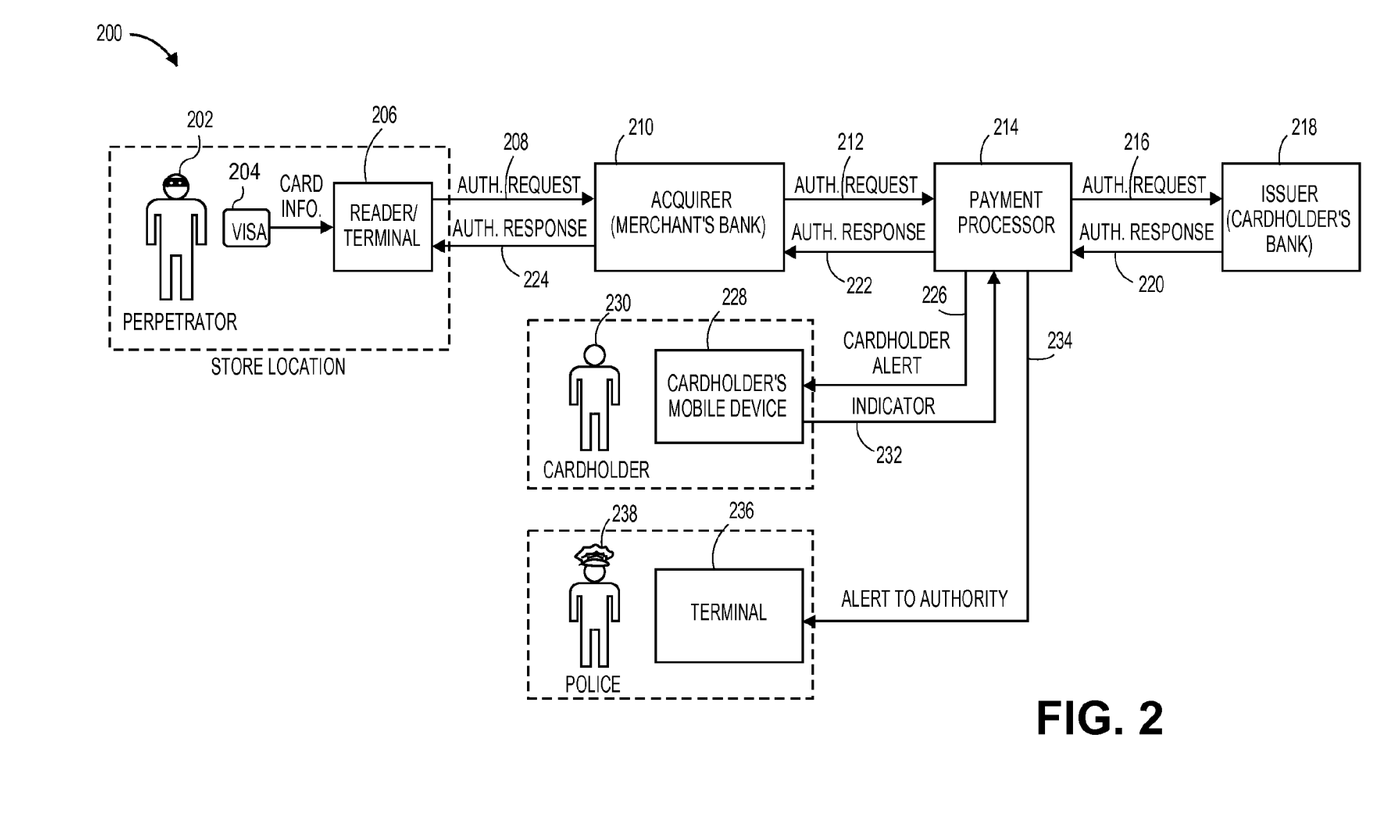
FIG. 2 is a network-level diagram illustrating messages between entities in accordance with an embodiment.

FIG. 2 is a network-level diagram illustrating system 200 with messages between entities. Unauthorized person 202 uses stolen card 204 to initiate a transaction through an access device, card reader 206. Card reader 206 can be a point of sale (POS) terminal, a card reader attached to a cash register, or other device for transmitting information about the card into the card processing system. Authorization request 208 is sent from card reader 206 to acquirer 210. Acquirer 210 is the bank for the merchant with whom the person has commenced the transaction. Acquirer 210 sends authorization request 212, which may be a copy of authorization request 208, to payment processor 214. Payment processor sends authorization request 216, which may be a copy of authorization request 212, to issuer 218. Issuer 218 is the cardholder's bank.

After determining that there are enough funds in the account to cover the purchase, issuer 218 sends authorization response 220 to payment processor 214, and payment processor 214 sends authorization response 222, which may be a copy of authorization response 220, to acquirer 210. Acquirer 210 then sends authorization response 224, which may be a copy of authorization response 222, to card reader 206. Card reader 206 then displays whether issuer 218 authorizes the transaction.

If the transaction trips a preset trigger, then payment processor 214 sends cardholder alert 226 to the cardholder's mobile communication device 228. Upon reading the cardholder alert, cardholder 230 can select whether he disproves of or did not authorize the transaction. If cardholder 230 indicates that he or she did not authorize the transaction, then indicator 232 is sent from mobile device 228 to payment processor 214. Depending on the time since the attempted transaction with the stolen card, an alert 234 to authority is then sent from payment processor 214 to police terminal 236, which is read by police officer 238 for further action.

The payment processor 214 may be embodied by a payment processing network including one or more server computers. The server computer may include a data processor and a computer readable medium coupled to the data processor. It may include information indicative of instructions for causing one or more machines to perform operations, the operations comprising: sending a transaction notification message to a user after a transaction is attempted by an unauthorized person using an account identifier associated with a portable consumer device, wherein the transaction notification message is sent substantially contemporaneously with the attempted transaction; receiving a response indicator from the user that the attempted transaction is not authorized by the user; determining a time difference between a present time and a time that the transaction attempt occurred; comparing the time difference to a time threshold; based on whether the time difference is within the time threshold, taking corrective authoritative action substantially contemporaneously with the attempted transaction.

The cardholder's mobile device can include a cell phone or other carry-able or wearable electronic device. The device may be specifically for communication, or communication may be an adjunct feature of the main purpose (e.g. music playing) of the device. Other embodiments include those in which the user's device is not a mobile device, but a fixed device, such as a computer terminal, kiosk, etc. which can access email or other electronic communications.

Figure 3:
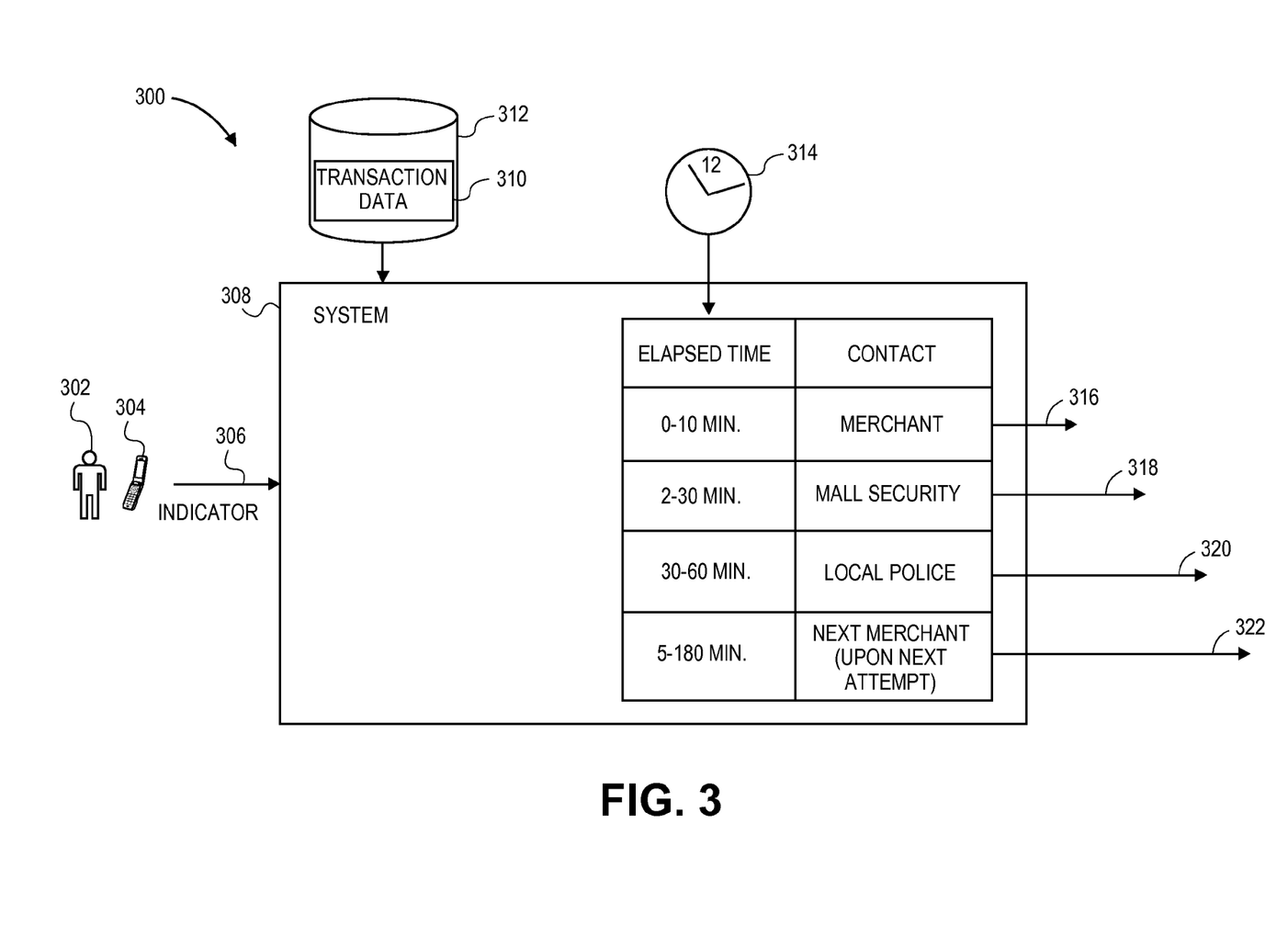
FIG. 3 is a system-level diagram with a list of authorities to contact in accordance with an embodiment.

FIG. 3 is a system-level diagram with a list of authorities to contact. User 302, using communication device 304, which corresponds to mobile device 228, sends indicator 306 to system 308. System 308 obtains transaction data 310 from database 312. Present time 314, which may be provided by an embedded clock in a computer, or synchronized with global positioning system (GPS) or other universal time, is used to determine how recent the transaction was attempted. In the exemplary embodiment, if the transaction was attempted within the past 0-10 minutes, then alert 316 is sent to the merchant with whom the transaction in question was initiated. Likewise, other authorities, such as mall police, local police, etc. can be alerted depending on the time that has elapsed.

Some time periods, such as 4 minutes can result in both the merchant and mall security being alerted. The alerts to the merchant (i.e. alert 316) and mall security (i.e. alert 318) can be the same as each other or different. Other time periods, such as 90 minutes, may result in no alert except for one to a subsequent merchant (i.e. alert 322).

If so much time has elapsed that the perpetrator may have gone to a different store and a second transaction is attempted, then the next merchant can be alerted through alert 322. Alert 322 can go to the headquarters of the second merchant, directly to the cashier with whom the second transaction is attempted, to the store security of the second merchant, or other authorities associated with the second merchant. The alert could also signal a camera, etc. to begin recording at the store of the second merchant.

Alert Cancellations

In some instances, an alert may be sent per the methods described above, but subsequent notifications by an accountholder call off the alert.

Figure 4:
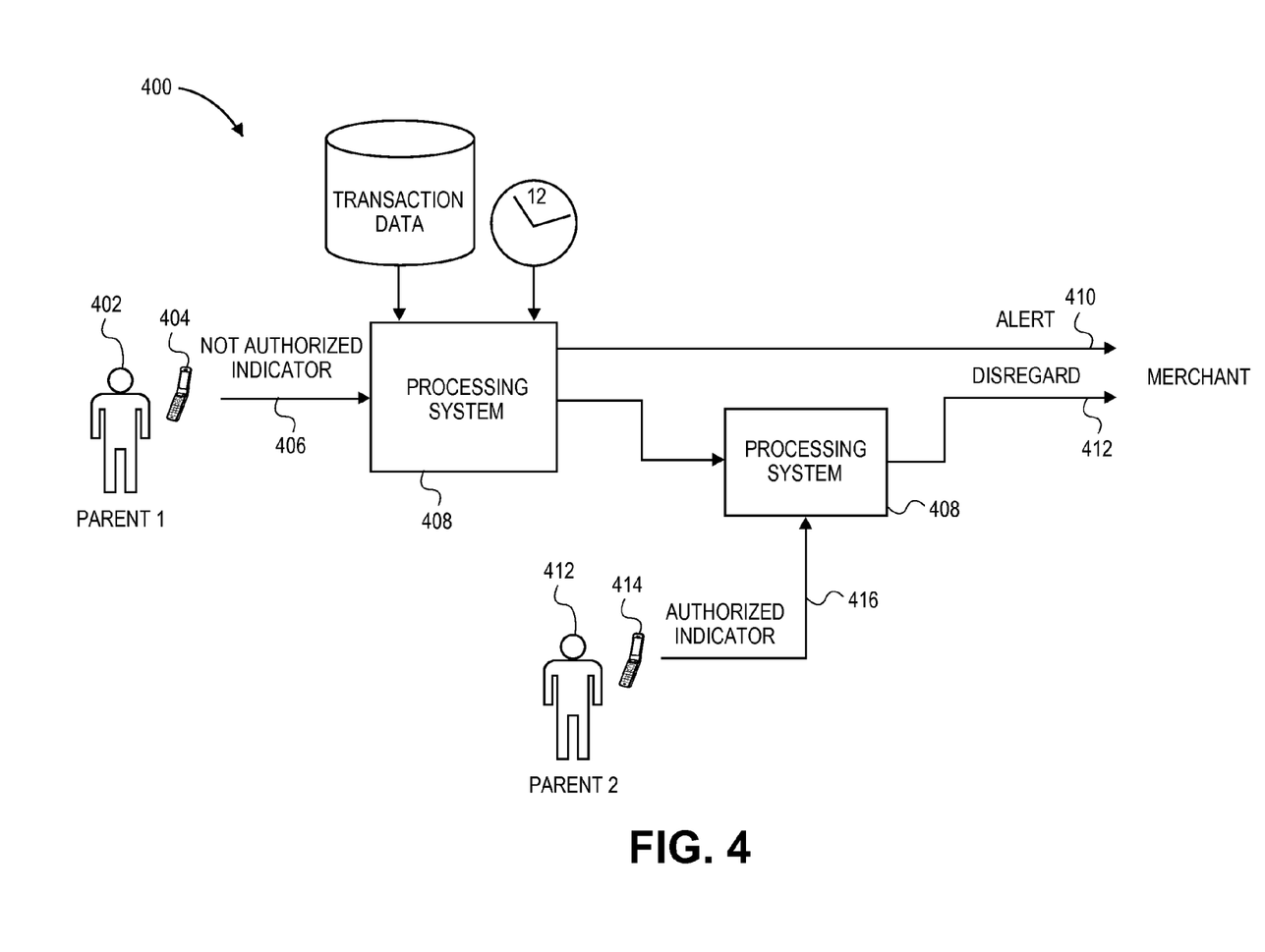
FIG. 4 is a system-level diagram illustrating a disregard message from a joint cardholder in accordance with an embodiment.

FIG. 4 is a system-level diagram illustrating a "disregard" message from a joint cardholder. A transaction is attempted with a merchant, and accountholder 402, who is a joint accountholder of the account for which the transaction was initiated, responds to a transaction notification message through communication device 404 that the transaction was not authorized. Indicator 406 is sent from communication device 404 to processing system 408, which sends alert 410 to the merchant.

Meanwhile, a second joint accountholder 412, who, for example, gave his credit card to their child to purchase a gift, also receives the transaction notification message. Second joint accountholder 412 sends his approval 416 through his own communication device 414 into the processing system.

Faced with conflicting authorizations, processing system 408 checks to see whether one accountholder can veto a purchase by the other accountholder. If there is no such veto power, and there are indications that at least one accountholder has approved of the transaction, disregard message 412 is sent to the merchant so that the merchant knows to disregard the previous fraud alert.

This cancellation feature can be helpful when two parents are joint accountholders, and one of the parents secretly buys an expensive gift for the other.

Figure 5:
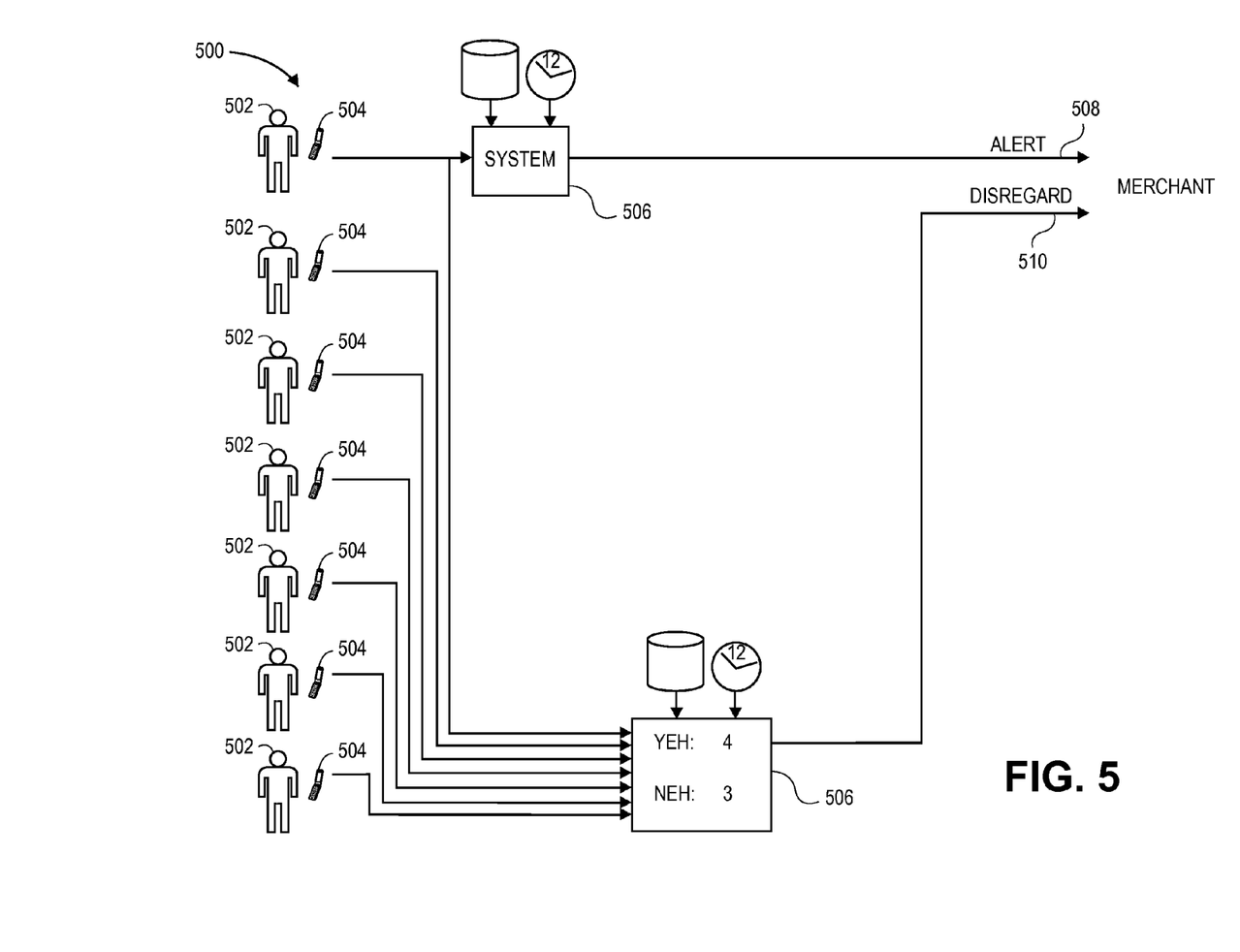
FIG. 5 is a system-level diagram illustrating a disregard message based on a vote of joint accountholders in accordance with an embodiment.

FIG. 5 is a system-level diagram illustrating a disregard message based on a vote of joint accountholders. Joint accountholders 502 each have their own communication devices 504. After alert 508 is sent from system 506 because of one joint accountholder's negative response to a transaction notification message, responses from other joint accountholders can be weighed. If, as in the exemplary case, more joint accountholders authorize the transaction than those who do not, then disregard message 510 is sent to the merchant.

This can be useful in cases in which there are multiple, disparate people purchasing. For example, a corporate buying department that issues credit cards to employees or board of directors that issues spending accounts to individual members may wish to enroll in such a "voting" system in order to detect fraud while also minimizing false alarms.

Any sent of joint accountholders can communicate on one device instead of each having their own device. For example, two joint accountholders may check their email and see a transaction notification message from one computer.

Figure 6:
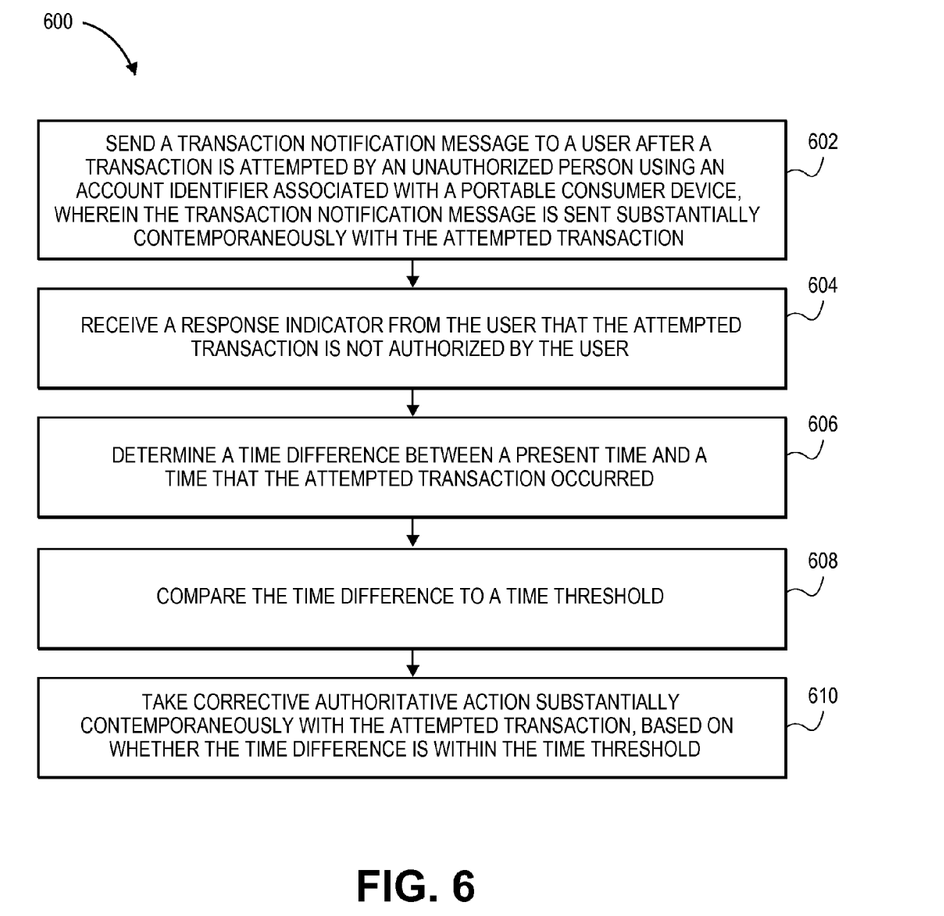
FIG. 6 is a flowchart illustrating an embodiment in accordance with an embodiment.

FIG. 6 shows an example flowchart illustrating process 600 in accordance with one embodiment. This process can be automated in a computer or other machine. The process can be coded in software, firmware, or hard coded as machine-readable instructions and run through a processor that can implement the instructions. In operation 602, a transaction notification message is sent to a user after a transaction is attempted by an unauthorized person using an account identifier associated with a portable consumer device. The transaction notification message is sent substantially contemporaneously with the attempted transaction. In operation 604, a response indicator is received from the user that the attempted transaction is not authorized by the user. In operation 606, a time difference between a present time and a time that the transaction attempt occurred is calculated or otherwise determined. In operation 608, the time difference is compared to a time threshold which was entered by the user during enrollment. In operation 610, corrective authoritative action is taken substantially contemporaneously with the attempted transaction. The action taken is based on whether the time difference is within the time threshold indicated by the user. These operations may be performed in the sequence given above or in different orders as applicable.

Obtaining Transaction Data

Figure 7:
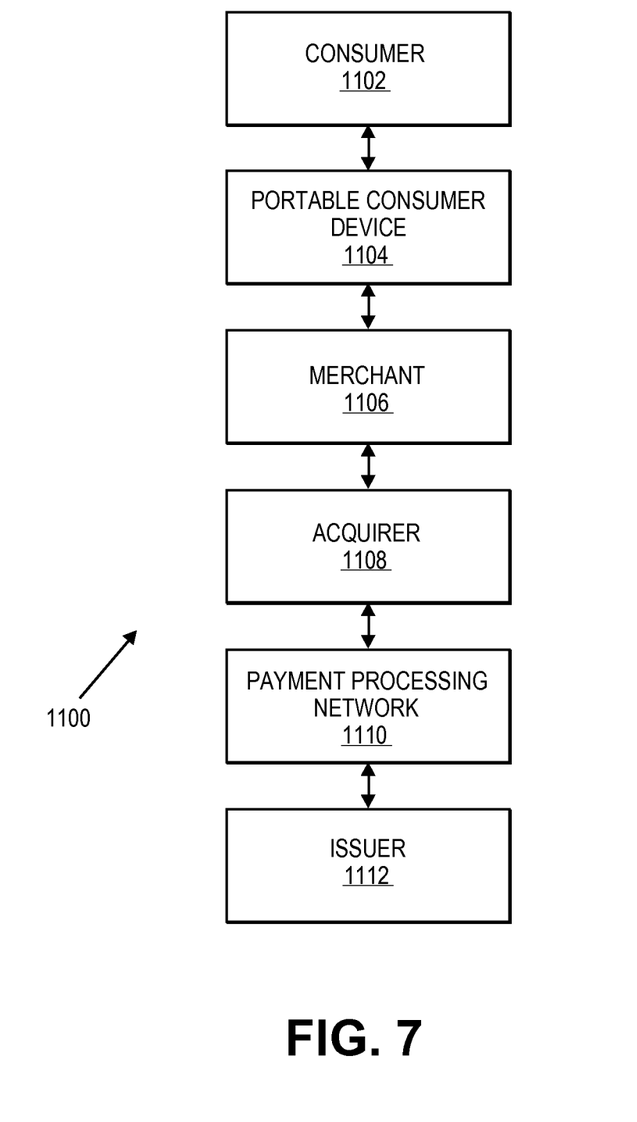
FIG. 7 shows a block diagram of a system that can be used in some embodiments.

The transaction data can be obtained in any suitable manner. The transaction data can be generated using the system shown in FIG. 7. FIG. 7 shows a system 1100 that can be used in an embodiment of the invention. The system 1100 includes a merchant 1106 and an acquirer 1108 associated with the merchant 1106. In a typical payment transaction, a consumer 1102 may purchase goods or services at the merchant 1106 using a portable consumer device 1104. The acquirer 1108 can communicate with an issuer 1112 via a payment processing network 1110.

The consumer 1102 may be an individual, or an organization such as a business that is capable of purchasing goods or services.

The portable consumer device 1104 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 1110 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 1110 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 1110 may use any suitable wired or wireless network, including the Internet.

The merchant 1106 may also have, or may receive communications from, an access device that can interact with the portable consumer device 1104. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 1104.

In a typical purchase transaction, the consumer 1102 purchases a good or service at the merchant 1106 using a portable consumer device 1104 such as a credit card. The consumer's portable consumer device 1104 can interact with an access device such as a POS (point of sale) terminal at the merchant 1106. For example, the consumer 1102 may take a credit card and may swipe it through an appropriate slot in the POS terminal. Alternatively, the POS terminal may be a contactless reader, and the portable consumer device 1104 may be a contactless device such as a contactless card.

An authorization request message is then forwarded to the acquirer 1108. After receiving the authorization request message, the authorization request message is then sent to the payment processing network 1110. The payment processing network 1110 then forwards the authorization request message to the issuer 1112 of the portable consumer device 1104.

At this point, in some embodiments a cardholder alert 226 (see FIG. 2) is sent to the cardholder's registered mobile communication device 228. The cardholder can then flag the purchase as fraud and authorities can be notified. Indicator 232 is sent from mobile device 228 to payment processor 214, and police terminal 236 is alerted. If the cardholder ignores or approves of the purchase, then the transaction continues to run its course.

After the issuer 1112 receives the authorization request message, the issuer 1112 sends an authorization response message back to the payment processing network 1110 to indicate whether or not the current transaction is authorized (or not authorized). The transaction processing system 1110 then forwards the authorization response message back to the acquirer 1108. The acquirer 1108 then sends the response message back to the merchant 1106.

After the merchant 1106 receives the authorization response message, the access device at the merchant 1106 may then provide the authorization response message for the consumer 1102. The response message may be displayed by the POS terminal, or may be printed out on a receipt.

At the end of the day, a normal clearing and settlement process can be conducted by the transaction processing system 1110. A clearing process is a process of exchanging financial details between and acquirer and an issuer to facilitate posting to a consumer's account and reconciliation of the consumer's settlement position. Clearing and settlement can occur simultaneously.

The transaction data can be captured by the payment processing network 1110 and a computer apparatus in the payment processing network (or other location) may process the transaction data as described in this application. The captured transaction data can include data including, but not limited to: the amount of a purchase, the merchant identifier, the location of the purchase, whether the purchase is a card-present or card-not-present purchase, etc.

The various participants and elements in FIG. 7 may operate one or more computer apparatuses to facilitate the functions described herein. Any of the elements in FIG. 7 may use any suitable number of subsystems to facilitate the functions described herein.

Figure 8:
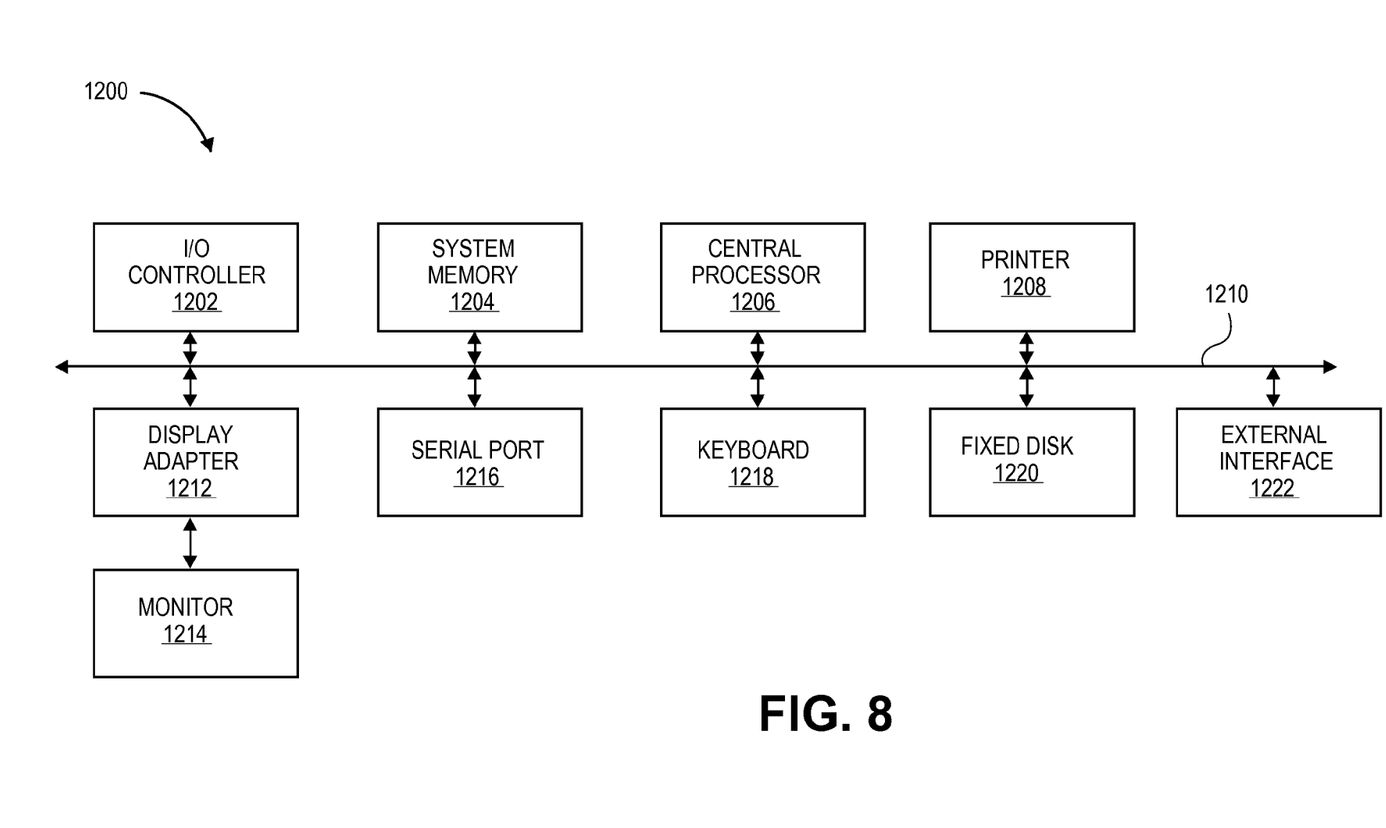
FIG. 8 shows a block diagram of an exemplary computer apparatus that can be used in some embodiments.

Examples of such subsystems or components are shown in FIG. 8. The subsystems shown in FIG. 8 are interconnected via a system bus 1210. Additional subsystems such as a printer 1208, keyboard 1218, fixed disk 1220 (or other memory comprising computer readable media), monitor 1214, which is coupled to display adapter 1212, and others are shown. Peripherals and input/output (I/O) devices, which couple to I/O controller 1202, can be connected to the computer system by any number of means known in the art, such as serial port 1216. For example, serial port 1216 or external interface 1222 can be used to connect the computer apparatus to a wide area network such as the Internet, a mouse input device, or a scanner. The interconnection via system bus allows the central processor 1206 to communicate with each subsystem and to control the execution of instructions from system memory 1204 or the fixed disk 1220, as well as the exchange of information between subsystems. The system memory 1204 and/or the fixed disk 1220 may embody a tangible computer readable medium.

Embodiments of the invention are not limited to the above-described embodiments. For example, although separate functional blocks are shown for an issuer, payment processing network, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

sending, using a server computer, a transaction notification message to a user after a transaction is attempted on a joint account by an unauthorized person using an account identifier associated with a portable consumer device, wherein the user is a first accountholder of the account, wherein the transaction notification message is sent by the server computer after an, initiation of the attempted transaction;

receiving a response indicator from the user that the attempted transaction is not authorized by the user;

determining a time difference between a present time and a time that the transaction attempt occurred;

comparing, using at least one processor operatively coupled with a memory, the time difference to a time threshold;

based on whether the tune difference is within the time threshold, taking corrective authoritative action;

receiving additional response indicators from other accountholders of the account that the transaction attempt is authorized or is not authorized;

comparing a number of the response indicators that the transaction attempt was not authorized to a number of response indicators that the transaction attempt was authorized, the numbers of response indicators including the response indicator from the first accountholder, the response indicator from a second accountholder, and the additional response indicators from the other accountholders;

determining whether first accountholder can veto a transaction on the account; and based on a determination that the number of response indicators indicating that the transaction attempt was authorized outvote the number of response indicators indicating that the transaction attempt was not authorized, and based on a determination that the first accountholder cannot veto a transaction on the account, sending a message to an authority to disregard a previously sent alert.

2. The method of claim 1 further comprising:
locking a door at a location of the transaction, storing an internet protocol (IP) address of a camera at a location of the transaction, or allocating storage for image data from a camera at a location of the transaction.

3. The method of claim 1 further comprising:
automatically determining to what authority, from a list of authorities, to send an alert about the attempted transaction, the determination based on how recent the transaction attempt occurred.

4. The method of claim 1 further comprising:
receiving information about an attempt at a second transaction at a store location of a merchant;
sending an alert about the first transaction attempt to the store location, thereby allowing employees of the store location to scrutinize the second transaction attempt and a person initiating the second transaction attempt.

5. The method of claim 1 further comprising:
sending an alert, the alert including the time that the transaction attempt occurred, a merchant name associated with the transaction, and a store location at which the attempted transaction occurred.

6. The method of claim 1 further comprising:
based on the comparison of the time difference to the time threshold, sending one of an enable command, a slew command, and a do-not-erase command to a security camera at a store location where the transaction attempt occurred, thereby allowing image recording of the person initiating the transaction attempt.

7. The method of claim 1 wherein the transaction attempt is an attempt to purchase goods or services at a retail store location.

8. The method of claim 1 wherein the transaction attempt is an attempt to transfer funds between accounts.

9. The method of claim 1 further comprising:
sending an alert to a third-party security provider.

10. The method of claim 1 further comprising:
sending an alert to the merchant who attempted to process the transaction attempt, thereby allowing the merchant to scrutinize a person initiating the transaction attempt.

11. The method of claim 1 wherein the transaction attempt is associated with one of a credit card and debit card.

12. The method of claim 1 wherein the transaction attempt is part of a completed transaction.

13. The method of claim 1 wherein the steps are performed in the order shown.

14. The method of claim 1 wherein taking corrective authoritative action includes sending a command to a videocamera at a location of the transaction, the command selected from the group consisting of an actuation command, a zoom command, and an increase resolution command.

15. The method of claim 1 wherein taking corrective authoritative action is performed automatically after the comparison of the time difference to the threshold.

16. The method of claim 1 wherein taking corrective authoritative action includes sending an alert to a police agency local to a merchant store location at which the transaction was attempted.

17. A machine-readable non-transitory storable medium embodying information indicative of instructions for causing one or more machines to perform operations, the instructions comprising:

instructions for sending, using a server computer, a transaction notification message to a user after a transaction is attempted on a joint account by an unauthorized person using an account identifier associated with a portable consumer device, wherein the user is a first accountholder of the account, wherein the transaction notification message is sent by the server computer after an initiation of the attempted transaction;
instructions for receiving a response indicator from the user that the attempted transaction is not authorized by the user;
instructions for determining a time difference between a present time and a time that the transaction attempt occurred;
instructions for comparing, using at least one processor operatively coupled with a memory, the time difference to a time threshold;
instructions for, based on whether the time difference is within the time threshold, taking corrective authoritative action;
instructions for receiving additional response indicators from other accountholders of the account that the transaction attempt is authorized or is not authorized;
instructions for comparing a number of the response indicators that the transaction attempt was not authorized to a number of response indicators that the transaction attempt was authorized, the numbers of response indicators including the response indicator from the first accountholder, the response indicator from a second accountholder, and the additional response indicators from the other accountholders;
instructions for determining whether the first accountholder can veto a transaction on the account; and
instructions for, based on a determination that the number of response indicators indicating that the transaction attempt was authorized outvote the number of response indicators indicating that the transaction attempt was not authorized, and based on a determination that the first accountholder cannot veto a transaction on the account, sending a message to an authority to disregard a previously sent alert.

18. A computer system executing instructions in a computer program, the computer system comprising:
at least one processor; and
a memory operatively coupled with the at least one processor, the processor executing instructions comprising:
program code for sending, using a server computer, a transaction notification message to a user after a transaction is attempted on a joint account by an unauthorized person using an account identifier associated with a portable consumer device, wherein the user is a first accountholder of the account, wherein the transaction notification message is sent by the server computer after an initiation of the attempted transaction;
program code for receiving a response indicator from the user that the attempted transaction is not authorized by the user;
program code for determining a time difference between a present time and a time that the transaction attempt occurred;
program code for comparing, using at least one processor operatively coupled with a memory, the time difference to a time threshold;
program code for, based on whether the time difference is within the time threshold, taking corrective authoritative action;

program code for receiving additional response indicators from other accountholders of the account that the transaction attempt is authorized or is not authorized;

program code for comparing a number of the response indicators that the transaction attempt was not authorized to a number of response indicators that the transaction attempt was authorized, the numbers of response indicators including the response indicator from the first accountholder, the response indicator from a second accountholder, and the additional response indicators from the other accountholders;

program code for determining whether the first accountholder can veto a transaction on the account; and program code for, based on a determination that the number of response indicators indicating that the transaction attempt was authorized outvote the number of response indicators indicating that the transaction attempt was not authorized, and based on a determination that the first accountholder cannot veto a transaction on the account, sending a message to an authority to disregard a previously sent alert.

* * * * *